United States Patent [19]

Madzgalla et al.

[11] Patent Number: 4,629,037

[45] Date of Patent: Dec. 16, 1986

[54] SELF-RETRACTING BRAKE PAD ASSEMBLY FOR SPOT TYPE DISC BRAKES

[75] Inventors: Hans-Georg Madzgalla, Koblenz; Christian L. Schroeter, Sinzig, both of Fed. Rep. of Germany

[73] Assignee: Lucas Industries public limited company, Birmingham, England

[21] Appl. No.: 651,331

[22] Filed: Sep. 17, 1984

[30] Foreign Application Priority Data

Sep. 22, 1983 [DE] Fed. Rep. of Germany ... 8327272[U]

[51] Int. Cl.⁴ .......................................... F16D 55/02
[52] U.S. Cl. .................................. 188/71.8; 188/72.3; 188/73.38
[58] Field of Search .............. 188/196 P, 73.36, 73.37, 188/73.38, 73.39, 21.8, 72.3

[56] References Cited

U.S. PATENT DOCUMENTS

| | | | |
|---|---|---|---|
| 2,762,461 | 9/1956 | Naumann | 188/196 P X |
| 3,754,624 | 8/1973 | Eldred | 188/73.38 X |
| 4,181,200 | 1/1980 | Souma | 188/73.38 |

FOREIGN PATENT DOCUMENTS

| | | |
|---|---|---|
| 1775586 | 10/1970 | Fed. Rep. of Germany . |
| 3023103 | 1/1981 | Fed. Rep. of Germany ..... 188/72.3 |
| 3018370 | 11/1981 | Fed. Rep. of Germany ... 188/73.38 |
| 3142293 | 5/1983 | Fed. Rep. of Germany . |
| 74774 | 6/1977 | Japan ................................. 188/73.38 |
| 67066 | 6/1978 | Japan ................................. 188/72.3 |
| 2036898 | 7/1980 | United Kingdom ............ 188/73.36 |

Primary Examiner—George E. A. Halvosa
Attorney, Agent, or Firm—Scrivener Clarke Scrivener & Johnson

[57] ABSTRACT

A self-retracting brake pad assembly has a pair of lateral faces each of which having at least a portion supportable at a carrying brake member e.g. a brake carrier. A recess is located close to the middle of each of the two lateral faces. A return spring assembly comprises a pair of guide members each received in one of the recesses and spring arms protrude laterally from one end of each guide member. The spring arms are supportable in the carrying brake member, and elastically deformable into a final position by an extent determining the brake clearance. The guide members are clamped in the respective recess and displaceable in the same only when overcoming frictional resistance greater than the return force of the spring arms in the final position thereof.

9 Claims, 11 Drawing Figures

U.S. Patent  Dec. 16, 1986  Sheet 1 of 3  4,629,037
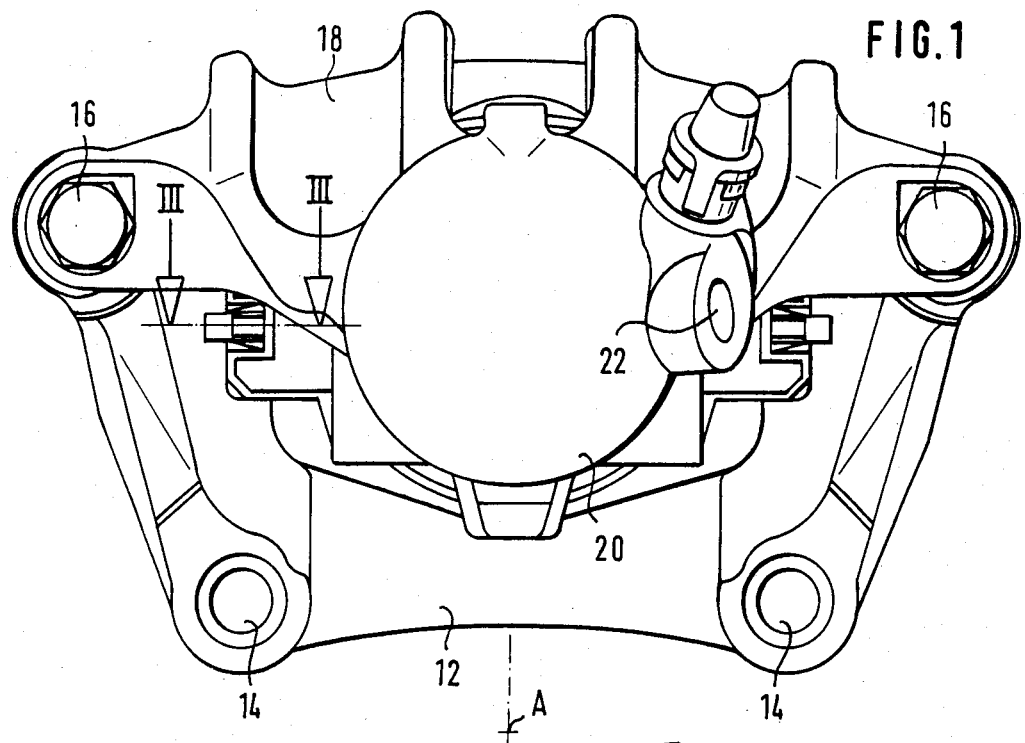
FIG. 1
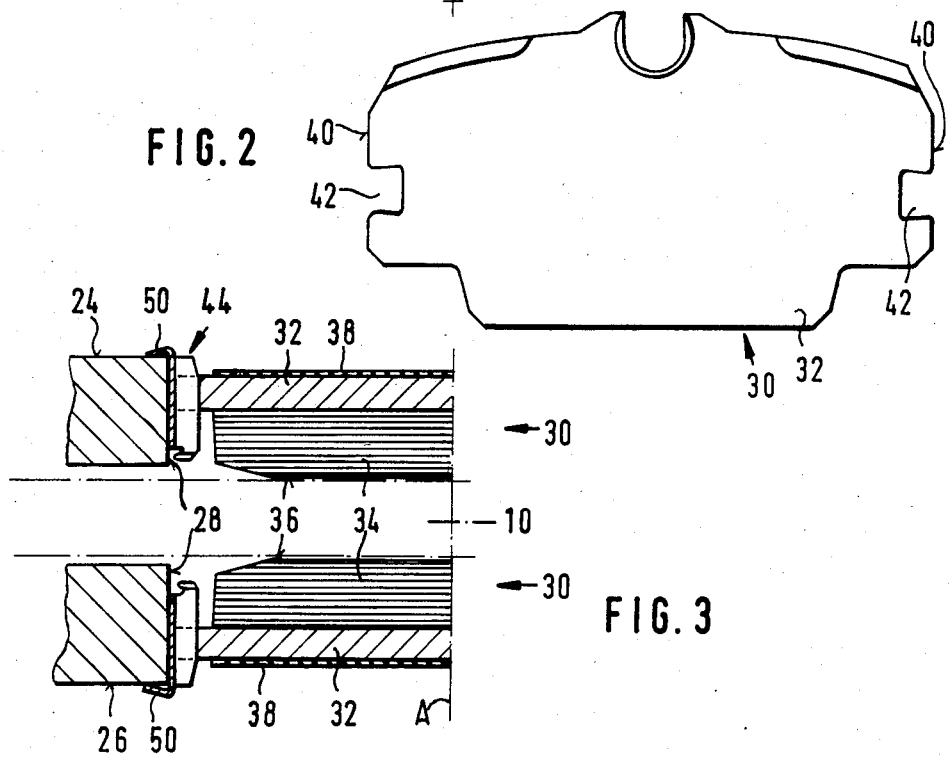
FIG. 2
FIG. 3

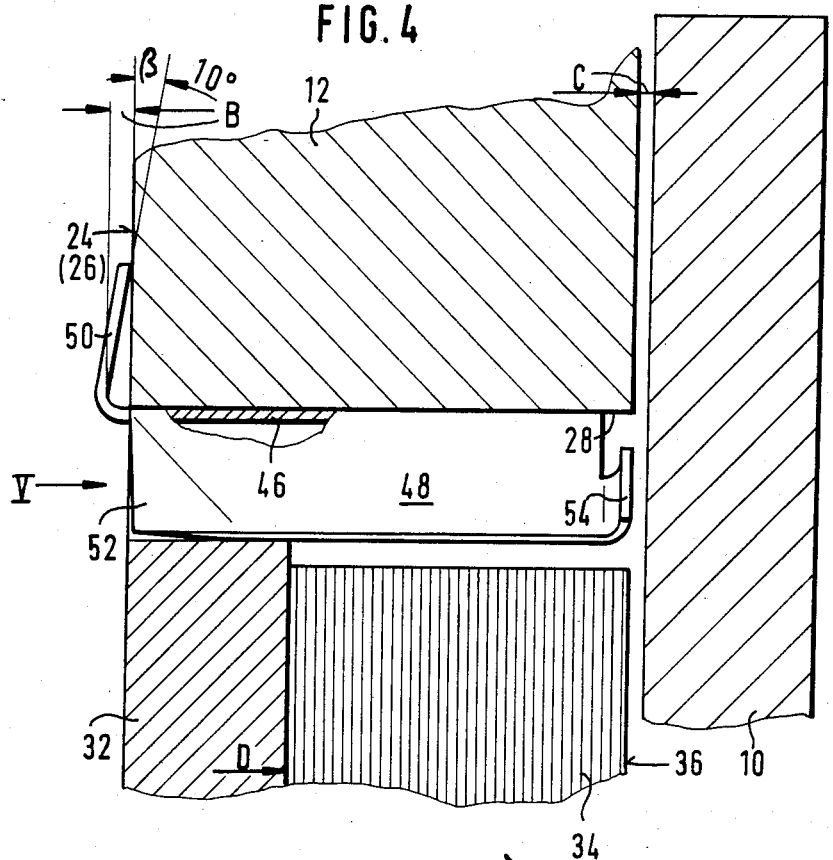
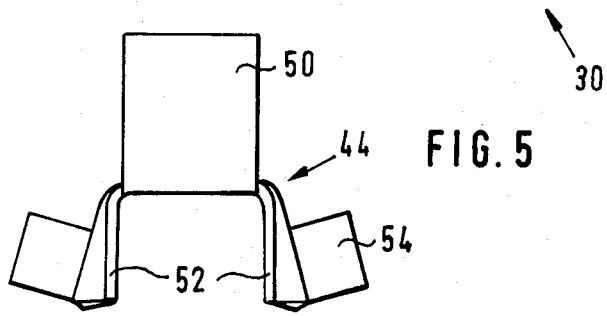
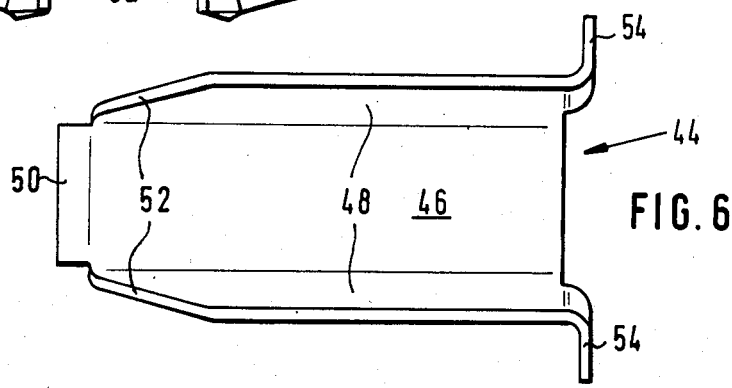

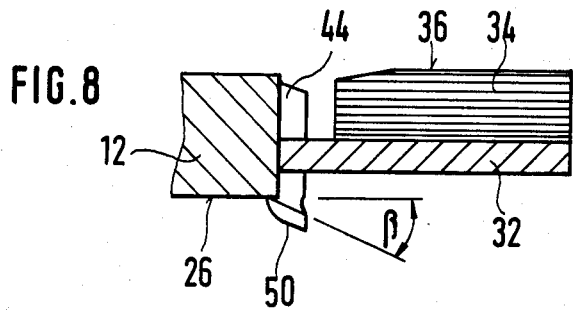
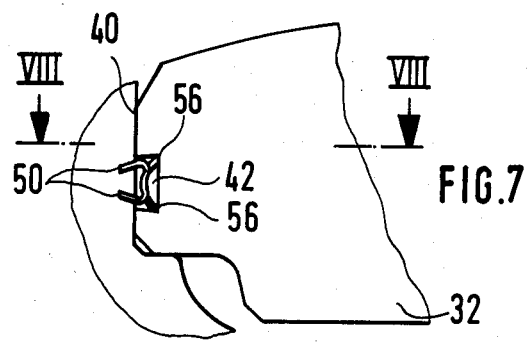
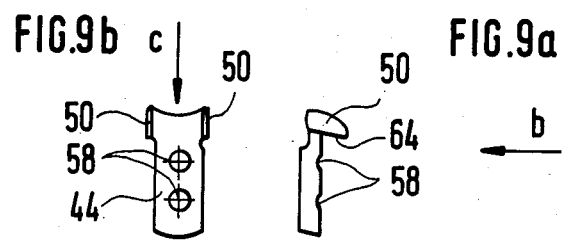
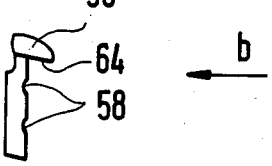
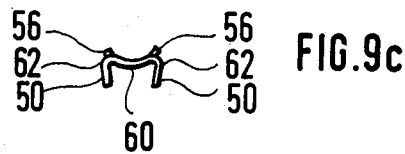

SELF-RETRACTING BRAKE PAD ASSEMBLY FOR SPOT TYPE DISC BRAKES

The invention relates to a self-retracting brake pad assembly for spot type disc brakes, comprising a brake surface adapted to be engaged with a brake disc, a pair of lateral faces each of which having at least a portion supportable at a carrying brake member to transmit braking forces, a pair of recesses, a pair of guide members each received in one of the recesses, and a return spring assembly connected to the guide members.

A spot type disc brake comprising a pair of brake pads of the kind described above is known from DE No. 1 775 586 C3. In that case guide members and a return spring assembly are formed on a common retaining sheet for both brake pads which sheet or plate has bends extending inwardly by more than 90° in a direction vertical to the plane of the brake disc as well as in circumferencial direction of the brake disc. The two bends extending parallel to the plane of the brake disc are locked in corresponding grooves of a brake yoke or caliper, while the other two bends extending vertically to the brake disc engage as guide members in lateral recesses of the brake pads and are intended to replace the conventional retaining pins. The return spring assembly is embodied by a leaf spring riveted in its center to the retaining sheet and having a pair of S-shaped bent spring portions symmetrical to its center. By these spring portions the leaf spring exerts an obliquely downwardly and outwardly directed force on an upper edge of one each of the two brake pads so as to press the same away from the brake disc after each brake actuation.

It cannot be avoided with this known arrangement that the spring forces exerted by the leaf spring on the brake pads together with the frictional resistance by which the leaf spring, on the one hand, and the guide members, on the other hand, counteract any displacement of the brake pads, generate moments by which the brake pads are tilted rather than being displaced, parallel with each other, away from the brake disc. If any such displacement does take place, it is of indefinite magnitude because the return forces exerted by the leaf spring on the brake pads tend to increase as the edges of the brake pads loaded by the leaf spring approach the center of the leaf spring on increasing wear of the brake lining and also because there is no constant relationship between the frictional resistances mentioned and the spring force. Consequently this known arrangement is not suitable to maintain a given clearance between the brake pads and the brake disc.

According to DE No. 31 42 293 A1 a sleeve-like compensating device is associated with the actuator of a disc brake, especially a plate type disc brake so as to maintain a constant brake clearance. The device disclosed comprises a substantially cylindrical frictional member and an annular spring member projecting radially inwardly from one end of this frictional member. By its cylindrical frictional member this compensating device encloses two spreaders which are in mutual engagement in the manner of a piston and cylinder arrangement and between which a pressure fluid space is defined. When a rest, an angle of less than 90° is included between the spring and frictional members and the spring member presses against the adjacent spreader only by its radial inner edge. The frictional member is held at the other spreader by a frictional force which is greater than the return force of the spring member. The distance by which the two spreaders may be moved apart until one of them is in full surface abutment at the spring member determines the clearance to ease the brake. It is only when this distance is surpassed, especially so because of wear of the brake lining that the one spreader takes along the entire compensation device so that the frictional member thereof will become displaced with respect to the other spreader so as to remain positioned in a new starting position upon actuation of the brake. In this new starting position the brake clearance again is maintained. This known sleeve-like compensation device clearly is not suited for direct cooperation with a brake pad in a spot type disc brake.

It is an object of the invention to develop a self-retracting brake pad for a spot type disc brake such that it will return to an inoperative position substantially in parallel with itself after each brake actuation and in this return position a given brake clearance will be maintained at great accuracy between the brake surface and the brake disc, regardless of the state of wear of the brake pad.

This object is met, in accordance with the invention, with a brake pad of the kind recited initially in that the recesses are located close to the middle of each of the two lateral faces, the return spring assembly comprises spring arms which protrude laterally from one end of each guide member, are supportable on the carrying brake member, and elastically deformable into a final position by an extent determining the brake clearance, and the guide members are clamped in the respective recess and displaceable in the same in a direction normal to the brake surface only when overcoming frictional resistance greater than the return force of corresponding spring arm in its final position.

Of course it is a condition for the maintenance of a predetermined brake clearance that a brake actuator is provided which will free the necessary path for return of the brake pad or pads after each actuation. Measures causing this are customary with spot type disc brakes so that they need not be described in detail in connection with the instant invention. It is merely for the sake of example that reference is made to the known restoring effect of an elastically deformable sealing ring of approximately square cross section disposed between the piston and cylinder of an hydraulic actuator for spot type disc brakes. Contrary to such known measures for brake actuators with which an accurate return of the corresponding brake pad still is not guaranteed, the invention relates to measures taken at the brake pad itself. By these measures it can be avoided positively that after brake actuation the brake pad still exerts residual braking moment on the brake disc, thus being responsible for increased fuel consumption and wear of the brake pad and, possibly, also for disturbing noise.

As with the known disc brake described initially (DE No. 1 775 586 C3) the brake pad according to the invention may have the two recesses open laterally. In this case an advantageous further development of the invention provides for the recesses to have a laterally outwardly converging outline, especially a dovetail outline, while the guide members have a complementary outline. In this manner it can be avoided that the guide members will fall laterally out of the recesses prior to the installation of the brake pad.

Also under the condition that the recesses are open laterally, another feature of the invention provides for at least one of the guide members to project laterally out of its recess beyond the corresponding lateral face and to be elastic in lateral direction. This provides the significant additional advantage of preventing abutting noise in spite of the necessary guiding clearance between the lateral faces of the brake pad and the corresponding guide faces of the carrying brake member. Without such a measure this noise would be caused when the brake pad is accelerated by the brake disc in circumferencial direction upon actuation of the brake and then hits violently against one of the guide faces at the carrying brake member.

It is also advantageous if each of the guide members according to the invention is provided with a stop to limit its displacement away from the brake surface. In the assembled condition displacement in the opposite direction is limited by the spring arm such that the guide member can never contact the brake disc.

In a preferred embodiment of the invention each guide member has an arcuate outline which is concave as seen from the adjacent lateral face.

In this case, too, the recesses may have an outline which converges laterally outwardly, especially a dovetail outline. It is convenient if the guide members in this case have sharp longitudinal edges engaging in acute-angled corners of the corresponding recess.

Moreover, the guide members may have at least one aperture between their longitudinal edges.

It is especially advantageous if a pair of spring arms protrude from one end of each guide member and if these spring arms are connected to each other and to the guide member by a body portion having the same arcuate outline as the guide member From this portion the spring arms are bent back laterally outwardly.

All embodiments of the invention described above preferably are so designed that each spring arm has a surface or edge facing the carrying brake member and including an acute angle with the longitudinal direction of the guide member.

The invention will be described further, by way of example, with reference to the accompanying drawings, in which:

FIG. 1 is an axial view of a spot type disc brake of a motor vehicle with brake pads according to the invention installed in the brake, as seen from the inner side of the vehicle;

FIG. 2 is a corresponding lateral view of one of the brake pads alone;

FIG. 3 is a sectional view along line III—III in FIG. 1

FIG. 4 is a cutout of FIG. 3 on a largely increased scale;

FIG. 5 is a partial view in the direction of arrow V in FIG. 4;

FIG. 6 is a view in the direction of arrow VI in FIG. 5;

FIG. 7 is a partial view of a brake pad according to another embodiment of the invention;

FIG. 8 is a sectional view along line VIII—VIII in FIG. 7;

FIG. 9a is a top plan view of a detail of FIG. 8;

FIG. 9b is a view as seen in the direction of arrow b in FIG. 9a;

FIG. 9c is a view as seen in the direction of arrow c in FIG. 9b.

The spot type disc brake shown is associated with a brake disc 10 whose axis of rotation A is indicated in FIGS. 1 and 3. The brake has a carrying brake member which in the embodiments shown, takes the form of the brake carrier 12. In assembled condition this brake carrier 12 straddles the brake disc 10 and it is formed with fastening holes 14 parallel to the axis A to take up screws by which it will be fastened to the vehicle. A pair of guide pins 16 likewise extends parallel to the axis A at the brake carrier 12, and a brake caliper 18 is guided for displacement on those pins. The brake caliper 18 also straddles the brake disc 10 and includes an hydraulic actuator 20 at its inner side with respect to the vehicle, said actuator having a connection 22 for a brake fluid line.

At either side of the brake disc 10 and parallel to the same are formed delimiting surfaces 24 and 26, respectively on the sides of the brake carrier 12 which are remote from each other. At right angles with respect to the same and at either side of the brake disc 10, the brake carrier 12 comprises a pair each of parallel guide surfaces 28 facing each other and receiving between them a brake pad 30 each.

Each brake pad 30 includes a backplate 32, for instance of steel and a brake lining 34 having a brake surface 36 which is to be held parallel to the brake disc 10 and thus at right angles to the axis A thereof at all times in the assembled condition, also when the brake is not actuated. The side of the backplate 32 of each brake pad 30 remote from the brake lining 34 is provided with a dampening layer 38, for example, made of an elastomer. Each backplate 32 is defined laterally by a pair of parallel lateral faces 40 which transmit braking forces in operation to the brake carrier 12 by one or the other guide surface 28, depending on the direction of rotation of the brake disc 10. A laterally open recess 42 of dovetail outline is formed, such as by stamping close to the middle of each lateral face 40. The two recesses 42 are diametrically opposed to each other with respect to the middle or center of gravity of the area of the corresponding brake surface 36.

A guide member 44 of sheet steel is inserted into each recess 42 in parallel with the axis A. This guide member has a U-shaped outline complementary to the outline of the recess 42. The outline is composed of a flat base 46 extending parallel to the corresponding lateral face 40 and slightly spaced outside of the same and of two legs 48 which are slightly diverging in cross section and abutting against the walls of the recess 42 whereby the guide member 44 is held captive in lateral direction. A spring arm 50 is formed of the same piece of sheet steel at the one end of the base 46 remote from the brake surface of the corresponding brake pad. This spring arm is bent outwardly by about 100°, and its outer edge abuts against the respective delimiting surfaces 24 and 26 of the brake carrier 12.

The legs 48 of the guide member 44 have end portions 52 which converge toward each other in the direction away from the corresponding brake surface 36 and which facilitate the sliding of the guide member 44 into the corresponding recess 42 from the side of the backplate 32 provided with the brake lining 34. The opposite ends of the legs 48 facing the brake surface 36 are bent outwardly at such angles that they form an abutment 54 which prevents the guide member 44 from being pushed entirely through the corresponding recess 42 in the direction mentioned.

As shown especially in FIGS. 3 and 4, the possibility of pushing the guide member 44 in the opposite direction is limited to a dimension B by the cooperation of the spring arm 50 and the corresponding delimiting surface 24 or 26 of the brake carrier 12. This dimension B is the spring travel covered by the spring arm 50 when it is deformed out of its inoperative position shown into a final position in which it will extend at right angels with respect to the base 46 and consequently be in full surface engagement with the corresponding delimiting surface 24 or 26 of the brake carrier 12.

When at rest, the brake surfaces 36 of both brake pads 30 each have a spacing of a dimension C from the corresponding brake surfaces of the brake disc 10. This distance is called the running clearance of the brake and it is equal to the dimension B. Upon actuation of the brake an actuating force D acts on the backplate 32 of each of the two brake pads 30, thereby displacing the respective brake pad and bringing its brake surface 36 into engagement with the brake disc 10 so that the running clearance of the brake, namely the dimension C is eliminated. The two respective associated guide members 44 take part in the displacement of each brake pad 30 because each of them is held in its corresponding recess 42 by frictional forces whose sum is greater than the return force of the corresponding spring arm 50 when deformed into its final position.

As the brake lining 34 wears down considerably during prolonged actuation of the brake, however, or if it was so worn already that the running clearance of the brake, anmely the dimension C provided is surpassed, the actuating force D will displace the respective brake pad 30 further. The associated guide members 44 can no longer take part in this continued displacement when their spring arms 50 have reached their final position. Consequently the guide members 44 move backwards with respect to the backplate 32 of the brake pad 30.

Upon termination of each brake actuation the spring arms 50 return into their inoperative position shown, whereby the corresponding brake pad 30 is displaced away from the brake disc 10 by the spring travel B. This restores the predetermined running clearance of the brake, namely the dimension C which is just as great. The same return or restoration takes place if no wear of the brake lining had to be compensated during the preceding brake actuation and the guide members 44 consequently were not displaced with respect to the backplate 32.

The embodiment shown in FIGS. 7 to 9c differs from the embodiment described so far as regards the design of the guide members 44 and spring arms 50.

Each of the two guide members 44 of which only one is shown in FIGS. 7 to 9c has an outline which is arcuate cross section and defined by sharp parallel longitudinal edges 56 and which is concave toward the bottom of the corresponding recess 42, in other words convex as seen from the corresponding lateral face 40. The guide member is inserted under bias into the corresponding dovetail recess 42. The longitudinal edges 56 each engage in an acute-angled corner of the recess 42, as shown in FIG. 7. The guide member 44 contacts the corresponding backplate 32 by these two longitudinal edges 56 only so that it is unlikely to seize by corrosion. The resistance offered against longitudinal displacement of the guide member 44 thus maintains its original magnitude during the entire lifetime of the brake pad 30. At a given width of the recess 42 the magnitude of the resistance depends on the profile width and on the resiliency of the guide member 44. In the embodiment shown the resiliency is increased by apertures 58 formed in the central range between the longitudinal edges 56.

A body portion 60 is formed at the end of the guide member 44 remote from the brake disc 10. In cross section this body portion has the same arcuate shape but spaced from the longitudinal edges 56 it merges into a pair of spring arms 50 by curvatures 62 in opposed sense. Together these spring arms correspond to the spring arm 50 shown in FIGS. 1 to 6 and, for this reason, they are marked by the same reference numeral. The spring arms 50 extend laterally outwardly and together with the body portion 60 present an approximately U-shaped outline which is open toward the outside.

Each spring arm 50 has a surface or edge 64 which faces the adjacent delimiting surface 26 (or 24, cf. FIG. 2) of the brake carrier 12 and is inclined with respect to the same by an angle $\beta$ of about 10°. The surfaces or edges 64 thus include an acute angle (90-$\beta$) with the longitudinal direction of the guide member 44. As in FIG. 4, the angle $\beta$ determines the distance B by which the spring arms 50 can bend until the surfaces or edges 64 will form a right angle with the longitudinal direction of the guide member 44.

The resiliency of the spring arms 50 in longitudinal direction of the guide member 44 depends on the thickness and elasticitiy of the sheet metal from which the guide member 44 including the body portion 60 and the spring arms 50 are stamped integrally. It further depends on the curvature and length of the arcuate portion by which the guide member 44 and the body portion 60 are connected. Thus there are several parameters by which the spring characteristic of the spring arms 50 may be adapted to the various requirements which may be different with different brakes.

To produce the guide member 44 including the body portion 60 and the spring arms 50 first an approximately T-shaped blank is formed by stamping and the transverse bar thereof is bent like a ridge. Then the longitudinal bar is bent so that the guide member 44 and the body portion 60 will be given the arcuate outline shown specifically in FIGS. 7 and 9c. The spring arms 50 are then bent back.

What is claimed is:

1. A self-retracting brake pad assembly for spot type disc brakes, comprising
   a brake surface adapted to be engaged with a brake disc,
   a pair of lateral faces each having at least a portion engageable with brake carrier to transmit braking forces,
   a recess in each of said lateral faces,
   a pair of guide members each received in one of the recesses, and
   a return spring connected to each guide member,
   said recesses being located close to the middle of each of the two lateral faces,
   each of said return springs comprising a spring arm which protrudes laterally from one end of each guide member for-engagement with a delimiting surface on the side of said carrier remote from said disc, said arms being elastically deformable upon limited movement of said guide member into a final position by an extent determining the brake clearance, and the guide members are frictionally received within the respective recesses and said receses are displaceable on the guide members in a direction normal to the brake surface only when overcoming frictional resistance greater than the return force of the corresponding spring arm in its final position.

2. The brake pad assembly as claimed in claim 1, wherein the two recesses are open laterally and have an outline which converges laterally outwardly, expecially of dovetail shape, and the guide members have complementary outline.

3. The brake pad assembly as claimed in claim 1, wherein the two recesses are open laterally and at least one of the guide members protrudes laterally out of its recess beyond the corresponding lateral face and is elastic in lateral direction.

4. The brake pad assembly as claimed in claim 1, wherein each guide member includes a stop to limit displacement thereof away from the corresponding brake surface.

5. The brake pad assembly as claimed in claim 1, wherein each guide member has an arcuate outline which is convex as seen from the adjacent lateral face.

6. The brake pad assembly as claimed in claim 5, wherein the two recesses are open laterally and have an outline which converges laterally outwardly, especially of dovetail shape, and the guide members have sharp longitudinal edges each engaging in an acute-angled corner of the corresponding recess.

7. The brake pad assembly as claimed in claim 6, wherein the guide members include at least one aperture between their longitudinal edges.

8. The brake pad assembly as claimed in claim 5, wherein a pair of spring arms protrude from one end of each guide member and are connected to each other and to the guide member by a body portion which has the same arcuate outline as the guide member and from which the spring arms are bent back laterally outwardly.

9. The brake pad assembly as claimed in any one of claims 1 to 7, wherein each spring arm has a surface or edge facing the carrying brake member and forming an acute angle with the longitudinal direction of the guide member.

* * * * *